United States Patent
Shimada

(10) Patent No.: US 9,886,603 B2
(45) Date of Patent: Feb. 6, 2018

(54) EQUIPMENT INSPECTION APPARATUS AND EQUIPMENT INSPECTION METHOD

(71) Applicant: FUJITSU FRONTECH LIMITED, Inagi-shi, Tokyo (JP)

(72) Inventor: Tsuyahiko Shimada, Maebashi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 0 days.

(21) Appl. No.: 15/334,969

(22) Filed: Oct. 26, 2016

(65) Prior Publication Data
US 2017/0046543 A1 Feb. 16, 2017

Related U.S. Application Data

(63) Continuation of application No. PCT/JP2014/070169, filed on Jul. 31, 2014.

(51) Int. Cl.
*G06K 7/10* (2006.01)

(52) U.S. Cl.
CPC .......... *G06K 7/10128* (2013.01); *G06K 7/10* (2013.01); *G06K 7/10366* (2013.01)

(58) Field of Classification Search
CPC ... G06K 7/10128; G06K 7/10; G06K 7/10366
See application file for complete search history.

(56) References Cited

U.S. PATENT DOCUMENTS

2005/0263591 A1    12/2005  Smith
2005/0285742 A1*   12/2005  Charych ................. G01S 3/20
                                                    340/572.1
2007/0080787 A1*   4/2007   Taki .................... G06K 7/0008
                                                    340/10.1
2008/0129454 A1*   6/2008   Chen ................... G06K 7/0008
                                                    340/10.1
2009/0267747 A1*   10/2009  Rivest ................. G06K 7/0008
                                                    340/10.51
2010/0026463 A1    2/2010   Ootaki et al.
(Continued)

FOREIGN PATENT DOCUMENTS

AU    2004290371 B2    5/2005
EP    1 683 079 B1     7/2009
EP    2 202 891 A1     6/2010
(Continued)

OTHER PUBLICATIONS

International Search Report dated Mar. 24, 2015, issued in counterpart International Application No. PCT/JP2014/070169 (2 pages).

*Primary Examiner* — Leon Flores
(74) *Attorney, Agent, or Firm* — Westerman, Hattori, Daniels & Adrian, LLP

(57) ABSTRACT

A search table acquisition unit preliminarily acquires a search table, which is a list of RFID tags attached to items of equipment. A tag search unit searches for the RFID tags, a comparison processing unit compares an RFID tag having responded with tag information in the search table and, for an RFID tag which has become unresponsive, a re-search processing unit performs a process of disabling the double-read prevention function, thereby enabling the RFID tag to respond. Accordingly, it becomes possible to reliably inspect items of equipment provided properly.

8 Claims, 12 Drawing Sheets

(56) References Cited

U.S. PATENT DOCUMENTS

2010/0176928 A1    7/2010  Isomura

FOREIGN PATENT DOCUMENTS

| | | |
|---|---:|---|
| JP | 9-20410 A | 1/1997 |
| JP | 2005-25691 A | 1/2005 |
| JP | 2007-514343 A | 5/2007 |
| JP | 2009-100274 A | 5/2009 |
| JP | 2011-28470 A | 2/2011 |
| JP | 2013-209184 A | 10/2013 |
| WO | 2005/048180 A1 | 5/2005 |
| WO | 2008/081551 A1 | 7/2008 |

* cited by examiner

23a RFID SEARCH TABLE

| No. | EQUIPMENT NAME | IDENTIFIER (EQUIPMENT TYPE + SERIAL NUMBER) | EQUIPMENT TYPE (FILTER FOR RFID DETECTION) | RFID POSITION | | | | | DETECTED FLAG | NECESSITY OF VISUAL INSPECTION | REMARKS |
|---|---|---|---|---|---|---|---|---|---|---|---|
| | | | | Y | X | POSEITION SEGMENT | PLACE | | | | |
| 1 | SEAT 1A ADULT LIFE VEST | A001 | LIFE VEST | 9 | 7 | 001 | UNDER SEAT | UN-DETECTED | NECESSARY | |
| 2 | SEAT 1D ADULT LIFE VEST | A002 | LIFE VEST | 7 | 7 | 001 | UNDER SEAT | UN-DETECTED | NECESSARY | |
| ... | ... | ... | ... | ... | ... | ... | ... | ... | ... | |
| | INFANT LIFE VEST | B001 | LIFE VEST | 4 | # | 017 | SHELF | UN-DETECTED | NECESSARY | |
| ... | ... | ... | ... | ... | ... | ... | ... | ... | ... | |
| | OXYGEN GENERATOR FOR SEATS 1A/1D/2A/2D | C001 | OXYGEN GENERATOR | 8 | 8 | 001 | CEILING | UN-DETECTED | UN-NECESSARY | |
| | OXYGEN GENERATOR FOR SEATS 1E/1K | C002 | OXYGEN GENERATOR | 2 | 8 | 017 | CEILING | UN-DETECTED | UN-NECESSARY | |

FIG. 3

ERROR TABLE

| EQUIPMENT TYPE | ERROR POSITION (SEAT NO./PLACE) | CAUSE OF ERROR |
|---|---|---|
| LIFE VEST | 1A/UNDER SEAT | TAG FAILURE |
| LIFE VEST | 5D/UNDER SEAT | ABSENCE OF EQUIPMENT |
| . . . | . . . | . . . |

FIG. 11

EQUIPMENT INSPECTION APPARATUS AND EQUIPMENT INSPECTION METHOD

CROSS-REFERENCE TO RELATED APPLICATION

This application is a continuation application of International Application PCT/JP2014/070169 filed on Jul. 31, 2014 which designated the U.S., the entire contents of which are incorporated herein by reference.

FIELD

The embodiments discussed herein relate to an equipment inspection apparatus and an equipment inspection method.

BACKGROUND

There is known an equipment inspection technique that confirms existence of equipment which may be always equipped with an RFID (Radio Frequency IDentification) tag attached thereto (see, for example, Patent Literature 1). Patent Literature 1 describes inspecting whether or not there is appropriately provided equipment which is obliged by law or the like to be provided in the cabin of an airliner, such as a life vest supposed to be provided under each seat. Such items of equipment are provided at predetermined positions with RFID tags being preliminarily attached thereto, and a search for RFID tags is performed during preflight inspection. The search for RFID tags is performed using a reader-writer device included in a mobile terminal device such as an HHT (handheld terminal).

FIG. 12 is an explanatory diagram explaining a general tag detection sequence using a reader-writer device. Note that, for simplicity of explanation of the tag detection operation, explanation of command parameters, the Arbitrate state for avoiding simultaneous responses of a plurality of RFID tags, or the like, is omitted in the explanatory diagram.

When the carrier is turned on by activation of the reader-writer device, an RFID tag located within a radio wave reachable range is powered by the radio wave and enters a Ready state. On this occasion, an inventoried flag provided in the tag enters an "undetected" state which is the initial value of the flag.

Next, the reader-writer device issues a Select command specifying, by a parameter, the type of equipment to be searched. Accordingly, an RFID tag of the equipment type specified by the parameter is enabled among the RFID tags being in the Ready state.

Next, the reader-writer device issues a Query command, and an RFID tag which has received the Query command transitions from the Ready state to a Reply state, then generates and transmits a random number message (RN16) for identifying the RFID tag itself.

Next, upon receiving the random number message, the reader-writer device transmits an ACK (ACKnowledgement) command including the random number message. An RFID tag, upon receiving the ACK command, transitions from the Reply state to an Acknowledged state. In the Acknowledged state, the RFID tag transmits an EPC (Electronic Product Code) which is a unique identifier, and sets the inventoried flag to "detected".

Then, the reader-writer device, upon receiving the EPC, confirms the existence of the RFID tag having the EPC, and sets "detected" to the tag information of the corresponding RFID tag in a search table storing tag information of RFID tags to be searched for. Accordingly, an item of equipment having attached thereto an RFID tag which has been set "detected" is confirmed to be appropriately provided.

Here, the RFID tag which transmitted the EPC has the inventoried flag set "detected" and therefore does not respond even when the reader-writer device repeatedly issues a Query command. The detected RFID tag does not respond, and thereby the reader-writer device is prevented from double reading the detected RFID tag, thus simplifying the search process. As a result, it becomes possible to inspect the equipment in the cabin of an airliner efficiently and quickly.

See, for example, Japanese Laid-open Patent Publication No. 2013-209184.

Preventing double reading of an RFID tag is very effective for simplifying the search process. However, when normal transmission of an EPC fails due to a communication error after the transition to the Acknowledged state, a reader-writer device is no longer capable of knowing that the RFID tag has been "detected". In such a case, the reader-writer device is not capable of identifying the RFID tag because the EPC is not notified to the reader-writer device, and therefore visual inspection is also impossible. In addition, the RFID tag returns to the state before the Ready state after a predetermined time has passed since the carrier turned off, and therefore it is possible to wait for the RFID tag to return to such a state and start the search process by the reader-writer device from scratch. In such a case, however, there has been a problem that, even when the RFID tag has returned to the state before the Ready state, the reader-writer device, which is not capable of knowing that the RFID tag has returned to the state before the Ready state, may also detect the "detected" RFID tag.

SUMMARY

According to one aspect, there is provided a non-transitory computer-readable storage medium storing a computer program that causes a computer to perform a procedure for detecting a double-read preventable RFID tag which does not respond to next and subsequent searches after having answered and responded to a search performed by a reader-writer device, the procedure including: searching for the RFID tag; making a comparison between the RFID tag which has answered and responded to the searching and tag information in a search table storing the tag information of the RFID tag to be searched for; and when there exists an undetected RFID tag supposed to respond based on the comparison between the RFID tag having responded and the tag information, making an attempt to restore a state of answering and responding to a search with a search specifying the undetected RFID tag, and searching for the undetected RFID tag.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a conceptual diagram illustrating an exemplary RFID search table stored in a server;

FIG. 11 illustrates an exemplary error table; and

DESCRIPTION OF EMBODIMENTS

Figure 1:
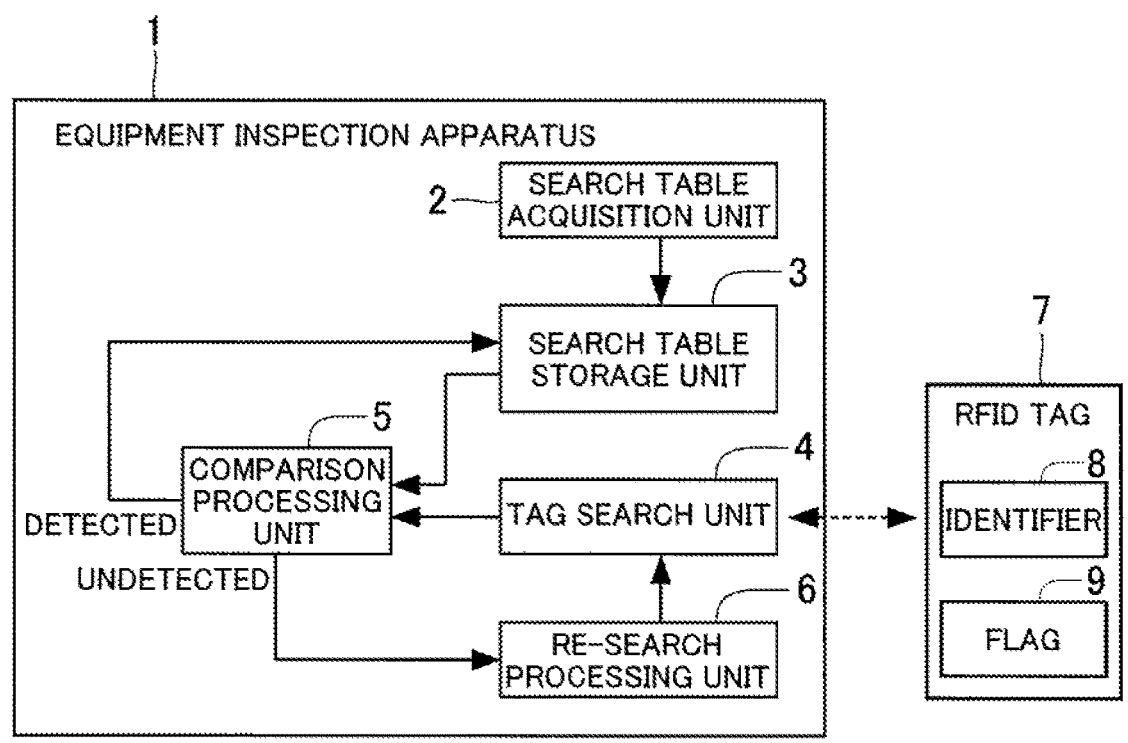
FIG. 1 is a functional block diagram of an equipment inspection apparatus according to a first embodiment.

In the following, embodiments of the present disclosure will be described in detail, referring to the drawing. Note that the respective embodiments may be modified to be implemented by a plurality of embodiments combined together within a consistent range.

FIG. 1 is a functional block diagram of an equipment inspection apparatus according to a first embodiment.

An equipment inspection apparatus 1 includes a search table acquisition unit 2, a search table storage unit 3, a tag search unit 4, a comparison processing unit 5, and a re-search processing unit 6. On the other hand, an RFID tag 7 attached to each item of equipment includes an identifier 8 and a flag 9, the flag 9 having a value reversible from "undetected" to "detected" when responding to a search by the equipment inspection apparatus 1.

The search table acquisition unit 2 of the equipment inspection apparatus 1 is configured to acquire a search table of tag information describing a list (inventory) of RFID tags 7 each being attached to a corresponding item of equipment, and the search table is downloaded from a server, for example.

When a search table is acquired by the search table acquisition unit 2, the search table storage unit 3 stores the acquired search table. The tag search unit 4 searches for the RFID tag 7 through mutual wireless communication with the RFID tag 7.

The comparison processing unit 5 compares an RFID tag which has responded to a search by the tag search unit 4 with tag information in the search table, and inspects an item of equipment by determining whether or not the item of equipment is provided according to the tag information. The comparison processing unit 5 sets "searched" to the search table with regard to the RFID tag which has responded.

The re-search processing unit 6 operates according to whether or not there remains an undetected RFID tag in the search table as a result of the comparison processing unit 5 excluding, from the search table, RFID tags which have responded to the search of RFID tags 7 by the tag search unit 4. In other words, the re-search processing unit 6 does nothing when there is no undetected RFID tag remaining in the search table. When, on the other hand, there exists an undetected RFID tag remaining in the search table, the re-search processing unit 6 instructs the tag search unit 4 to attempt to return the flag 9 to the undetected state with a search specifying the undetected RFID tag and subsequently search for the undetected RFID tag.

The comparison processing unit 5 may be notified, by the comparison processing, of an undetected RFID tag supposed to respond, and furthermore, of the identifier of the undetected RFID tag from the tag information in the search table. The tag search unit 4 notified of an undetected RFID tag and the identifier thereof then forcibly changes the detected tag to "undetected" by directly specifying and accessing the undetected RFID tag. Accordingly, changing the flag 9 of the RFID tag 7 to "undetected" makes it possible for the tag search unit 4 to detect the RFID tag 7 which has been undetected.

Next, description will be provided taking as an example a case where the equipment inspection apparatus 1 is applied to an RFID tag search device configured to inspect the equipment provided in the cabin of an airliner. The RFID tag search device may be a mobile terminal device functioning as a reader-writer device, and contactless inspection of items of equipment is realized by an inspector walking around the cabin while carrying the mobile terminal device. RFID tags are respectively attached to items of equipment preliminarily provided in the cabin. In addition, it is assumed that detailed information on items of equipment and RFID tags respectively attached to the items of equipment is stored in the server.

Figure 2:
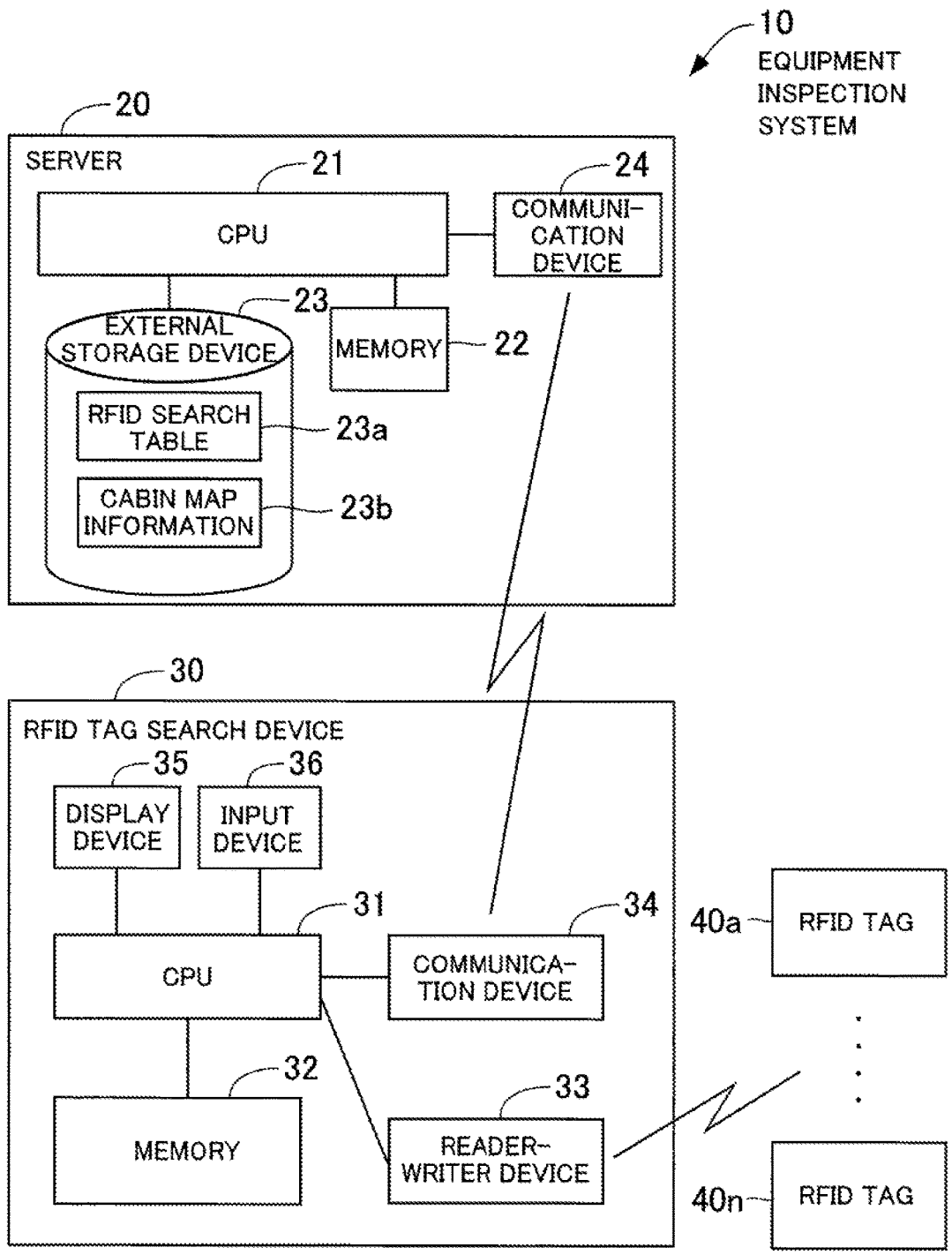
FIG. 2 is a conceptual diagram illustrating an exemplary configuration of an equipment inspection system according to a second embodiment.
Figure 4:
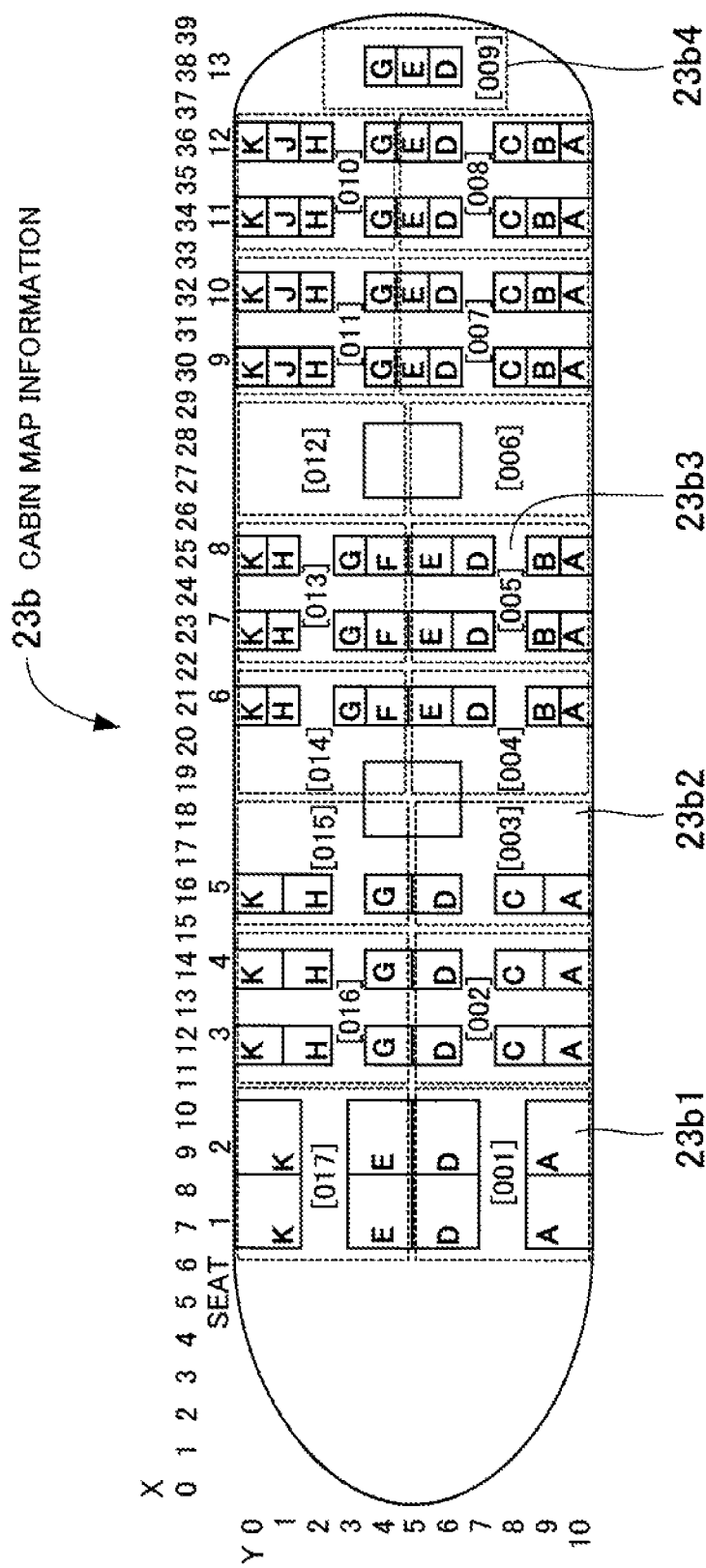
FIG. 4 is a conceptual diagram illustrating an exemplary cabin map information illustrating equipment of an airliner stored in the server.

FIG. 2 is a conceptual diagram illustrating an exemplary configuration of an equipment inspection system according to a second embodiment. FIG. 3 is a conceptual diagram illustrating an exemplary RFID search table stored in the server. FIG. 4 is a conceptual diagram illustrating an exemplary cabin map information illustrating equipment of an airliner stored in the server.

An equipment inspection system 10 according to the second embodiment has a server 20 and an RFID tag search device 30 as illustrated in FIG. 2.

The server 20, configured in a computer system, includes a CPU (Central Processing Unit) 21 functioning as the main processor, the CPU 21 being connected to a memory 22, an external storage device 23, and a communication device 24, respectively.

The memory 22, used as a main storage, temporarily stores the OS (Operating System) and application programs to be executed by the CPU 21, as well as data to be used when executing the application programs.

The external storage device 23 stores, besides the OS and the application programs, an RFID search table 23a and cabin map information 23b. The RFID search table 23a and the cabin map information 23b are preliminarily prepared for each type or each body of airliner.

The communication device 24, having a wireless information communication function, is used when performing wireless information communication with the RFID tag search device 30.

On the other hand, the RFID tag search device 30, a so-called inspection terminal (handheld terminal: HHT), is a mobile terminal device configured with a compact computer system. The RFID tag search device 30 may be a dedicated HHT, or a tablet terminal having a built-in general-purpose communication function and configured to function as an HHT by software.

The RFID tag search device 30 includes a CPU 31, the CPU 31 having a memory 32, a reader-writer device 33, a communication device 34, a display device 35, and an input device 36 respectively connected thereto.

The CPU 31, being configured to control the RFID tag search device 30 as a whole, executes some of the OS programs and an application program for searching the RFID tags, which are loaded in the main storage area of the memory 32.

The memory 32 includes a memory used as the main storage, and a nonvolatile memory such as a flash memory. The memory as the main storage temporarily stores the OS and the application program for searching the RFID tags to be executed by the CPU 31, the RFID search table 23a and the cabin map information 23b downloaded from the server 20, data to be used when executing application programs, or the like. The nonvolatile memory stores the OS, the application program for searching the RFID tags, and the like.

The reader-writer device 33 performs a process of recognizing RFID tags 40a to 40n by exchanging information by short distance wireless communication in the UHF (Ultra High Frequency) band with the RFID tags 40a to 40n attached to items of equipment to be inspected.

The communication device 34 performs information communication with the communication device 24 of the server 20.

The display device 35 may display various information including the cabin map information 23b and tag search errors, or unsearched/searched segments to an operator carrying the RFID tag search device 30.

The input device 36 is used by the operator to input instructions such as starting a tag search to the RFID tag search device 30. Note that the input device 36 may be implemented as an icon placed on a touch panel in a case where the touch panel is configured by combining the display device 35 and a position input device.

With the RFID tag search device 30 having the aforementioned configuration, the processing function of the application program for searching RFID tag stored in the memory 32 may be implemented by a computer including the CPU 31 as the main unit.

Here, the RFID search table 23a stored in the server 20 includes columns for No., equipment name, identifier (equipment type+serial number), equipment type (filter for RFID detection), RFID position, detected flag, necessity of visual inspection, and remarks, as illustrated in FIG. 3. The RFID position column, indicating where an item of equipment is provided in the cabin map information 23b illustrated in FIG. 4, has columns for X- and Y-coordinates in the cabin map information 23b, position segment, and place.

The cabin map information 23b, which is image information of the cabin to be searched, indicates, by X-coordinates and Y-coordinates, positions of a seat 23b1, a utility area 23b2, and an aisle 23b3. In addition, the cabin map information 23b as a whole is divided into a plurality of position segments 23b4 (the area indicated by (001)-(017) in FIG. 4). The position segments 23b4 are set based on a range in which the RFID tag search device is allowed to reliably communicate with RFID tags 40a to 40n when the operator stops on the aisle or enters a space in front of a seat on foot.

Figure 5:
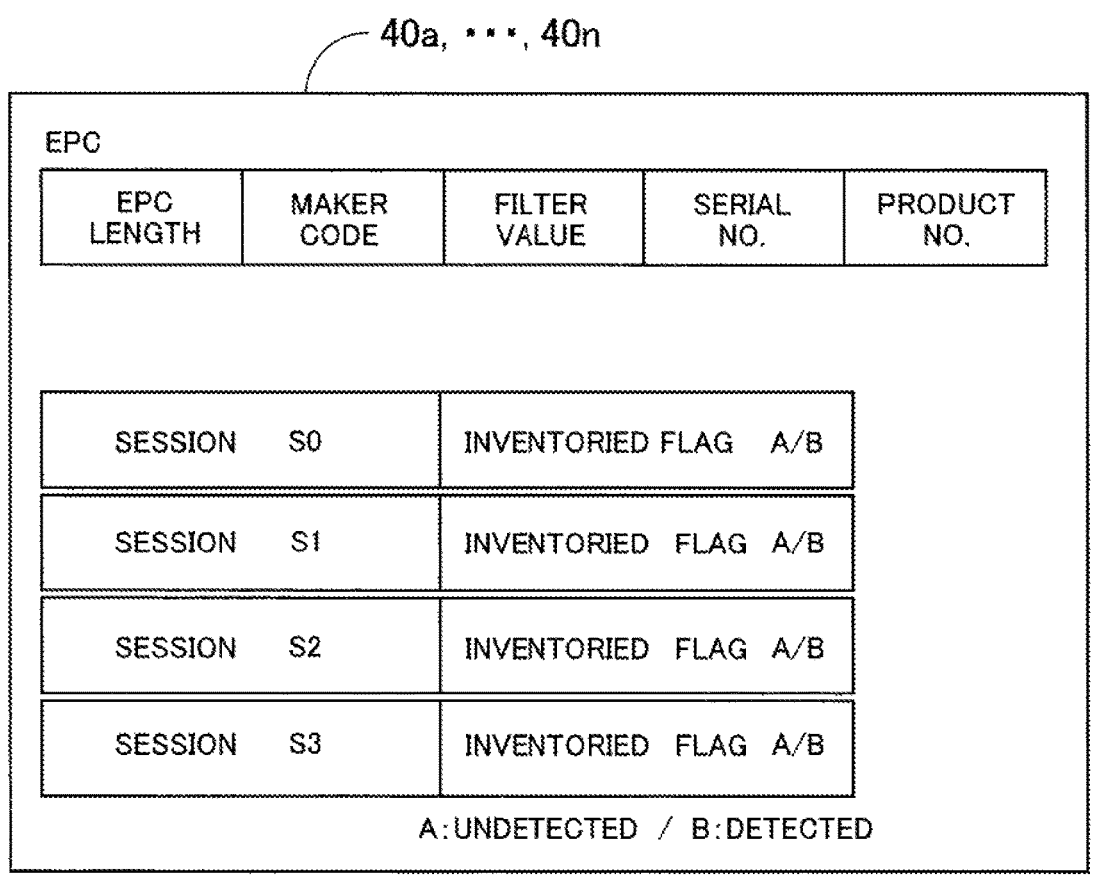
FIG. 5 illustrates an exemplary content memorized in an RFID tag.

FIG. 5 illustrates an exemplary content memorized in an RFID tag.

The RFID tags 40a to 40n each have an EPC as an identifier thereof. The EPC has, for example, an EPC length, a maker code, a filter value, a serial No., and a product No. Here, the filter value refers to the equipment type used when searching for a specific type of equipment, which corresponds to the equipment type (filter for RFID detection) defined in the RFID search table 23a.

The RFID tags 40a to 40n each include sessions (numbers S0, S1, S2 and S3) of four different functions used for wireless communication with the reader-writer device 33 of the RFID tag search device 30, and each session has an independent inventoried flag. In an exchange of command sequences, called an inventory round, only one of the four sessions functions. An inventoried flag may take two values A and B, the value of A representing "undetected", i.e., not answered to a tag search by the reader-writer device 33, and the value of B representing "detected", i.e., answered and responsed to a tag search.

Figure 6:
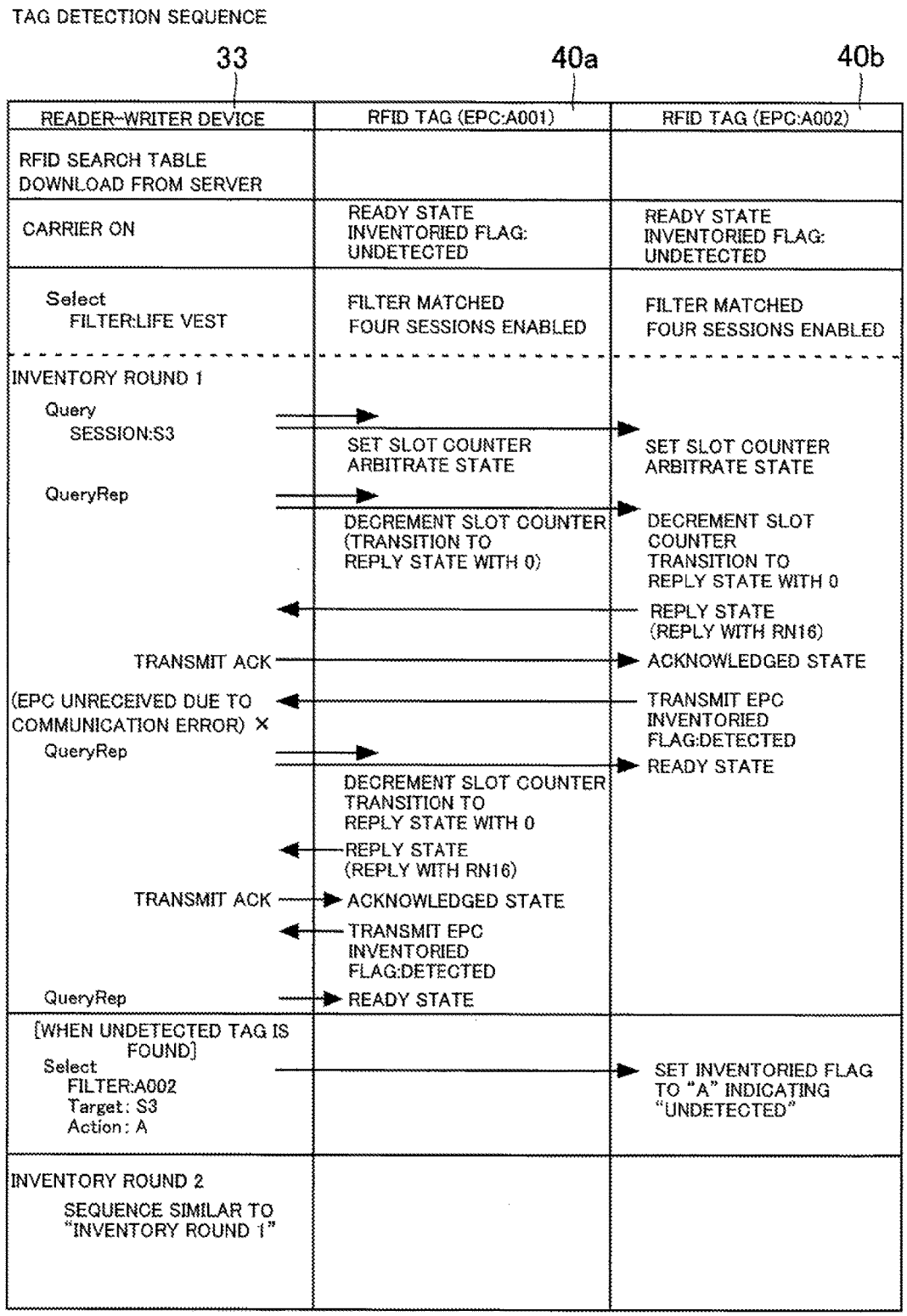
FIG. 6 illustrates an exemplary tag detection sequence.

FIG. 6 illustrates an exemplary tag detection sequence.

For simplicity, the tag detection sequence is described taking as an example a case of performing tag detection for two RFID tags 40a and 40b. Here, it is assumed that the EPC of the RFID tag 40a is "A001" and the EPC of the RFID tag 40b is "A002". Note that the letter "A" in the EPC is the equipment type indicating a life vest. The numerals "001" and "002" following the equipment type indicate serial Nos., respectively.

First, in the tag detection sequence, the RFID search table 23a is downloaded from the server 20, and all the tag information of the RFID tags 40a to 40n attached to items of equipment in an airliner is acquired.

Next, the reader-writer device 33 turns on the carrier. Accordingly, radio wave is emitted from the reader-writer device 33, and the RFID tags 40a and 40b located within a radio wave reachable range enter a Ready state. On this occasion, the inventoried flags included in the RFID tags 40a and 40b respectively are set to "A" indicating an "undetected" state, which is the initial value.

Next, the reader-writer device 33 issues a Select command specifying, by a parameter, the type of equipment to be searched. Here, a parameter "life vest" is specified in the filter as the equipment type. Accordingly, the RFID tags 40a and 40b attached to life vests become effective.

Next, the reader-writer device 33 issues a Query command specifying a session to be used in wireless communication. In the example of FIG. 6, a session with a session number S3 is specified.

Upon receiving the Query command, the RFID tags 40a and 40b transition to an Arbitrate state to avoid collision. In other words, the RFID tags 40a and 40b generate random numbers and set the random numbers to slot counters thereof. Next, the reader-writer device 33 repeatedly issues a QueryRep command after having issued the Query command. Upon receiving the QueryRep command, the RFID tags 40a and 40b decrement (−1) the slot counters.

Here, when the slot counter of the RFID tag 40b whose EPC is "A002" reaches zero first, the RFID tag 40b transitions to a Reply state, generates a 16-bit random number message (RN16) identifying the tag itself, and returns the RN16.

Next, the reader-writer device 33 which has received the RN16 transmits an ACK command including the RN16. Upon receiving the ACK command, the RFID tag 40b approves occupation of the session S3, and transitions to an Acknowledged state from the Reply state. In the Acknowledged state, the RFID tag 40b transmits the identifier EPC and sets the inventoried flag of the session S3 to "detected". Note that, although the RFID tag 40b in the Acknowledged state transitions to a Ready state upon receiving the QueryRep command, the inventoried flag is held "detected" without answering to the reader-writer device 33.

Next, after having received the QueryRep command and the slot counter thereof having reached zero, the RFID tag 40a with the EPC being "A001", indicating uncompleted transmission of the EPC, performs the same operation as the operation of the RFID tag 40a described above.

The reader-writer device 33 recognizes that there are two RFID tags 40a and 40b whose EPCs are "A001" and "A002", as RFID tags to be searched for from the RFID search table 23a. Therefore, even when the EPC transmitted from the RFID tag 40b has failed to be normally received due to a communication error or the like, as illustrated in FIG. 6, the reader-writer device 33 may know the existence of the unreceived RFID tag 40b. In other words, the reader-writer device 33 may identify the RFID tag 40b supposed to be existing by comparing the tag information including the received EPC with the tag information in the RFID search table 23a.

As described above, the RFID tag 40b, having set the inventoried flag to "detected", will not answer to the QueryRep command from the reader-writer device 33. In such a case, the inventoried flag which has been set to "detected" is forcibly set to "undetected" by the reader-writer device 33.

In other words, the RFID tag 40b that failed to receive the EPC has been identified from the RFID search table 23a and therefore the RFID tag 40b is directly specified and accessed. In the example illustrated in FIG. 6, a Select command is used, specifying, as parameters, the EPC for the filter, the session "S3" for the Target, and "A" for the Action indicating "undetected". Accordingly, the inventoried flag which has been set to "detected" in the session S3 will be forcibly set to "undetected".

Subsequently, the reader-writer device 33 becomes able to find a tag failed to be searched for by performing in the inventory round 2 a sequence similar to that in the inventory round 1 for RFID tags that have failed to receive the EPC.

Note that there may be a case where it is impossible to find an RFID tag 40b which has failed to be searched for by directly specifying the RFID tag 40b which has failed to be searched for and repeatedly attempting to forcibly switch the inventoried flag to "undetected", which has been set to "detected". For example, a case where an item of equipment itself is not equipped, or a case where an item of equipment is equipped but the RFID tag attached to the equipment has been failed. In such a case, it suffices that the operator performs visual inspection of the equipment.

In addition, although the inventoried flag is forcibly set to "undetected" as a method of disabling the double-read prevention function in the aforementioned example, the present disclosure is not limited thereto. For example, it is conceivable to use a session of a different number from the number of the session used for the search in the preceding inventory round 1 when performing a search specifying the undetected RFID tag to take advantage of the inventoried flag of the session being "undetected".

Next, the operation of the RFID tag search device 30 will be described, referring to a flowchart.

Figure 7:
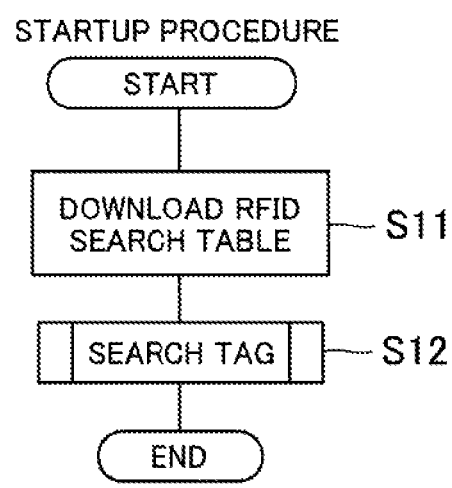
FIG. 7 is a flowchart illustrating a startup procedure.
Figure 8:
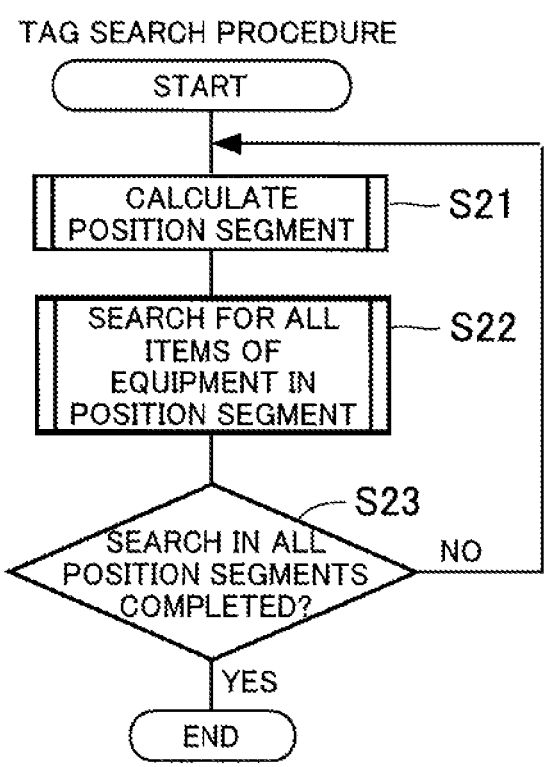
FIG. 8 is a flowchart illustrating a tag search procedure.
Figure 9:
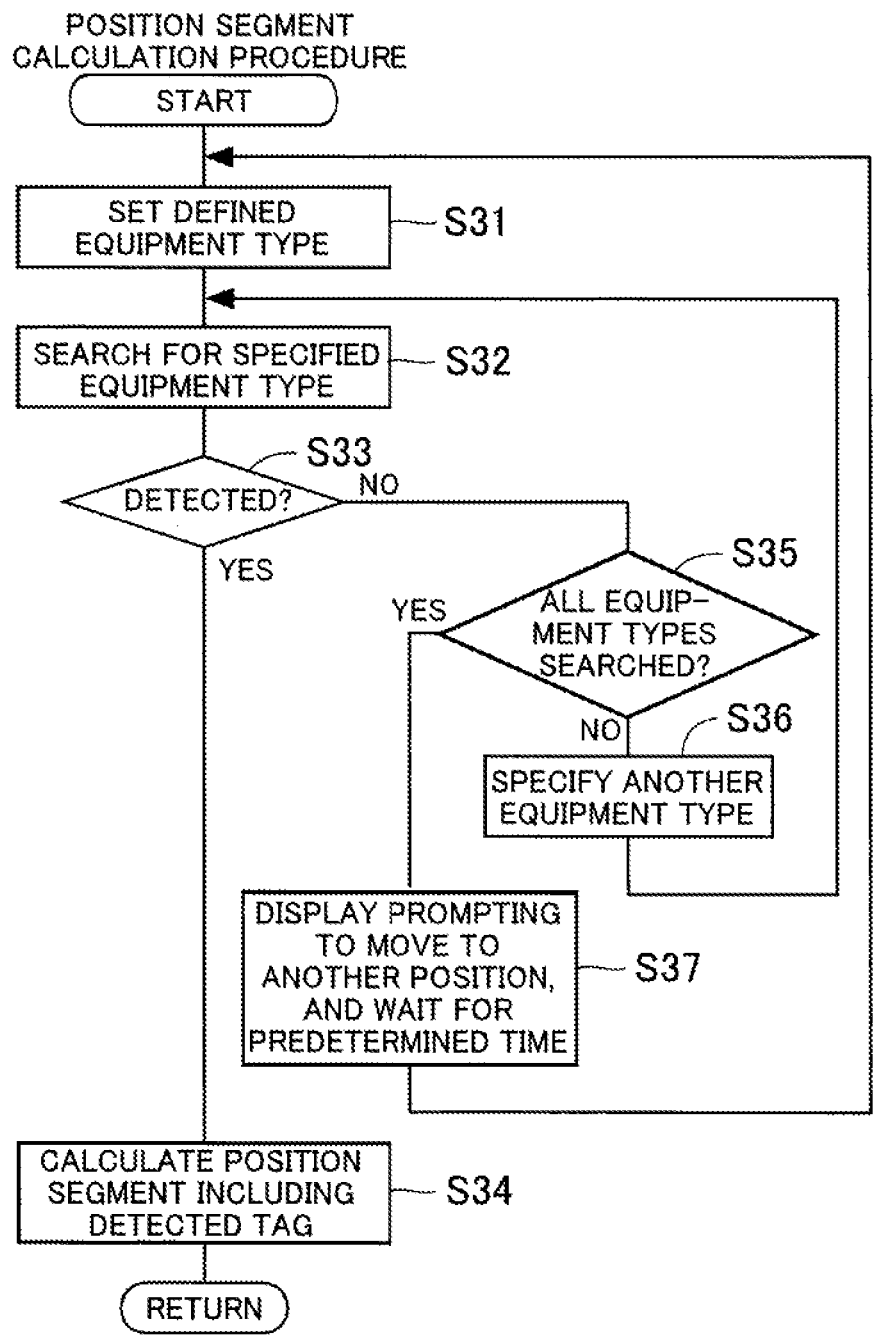
FIG. 9 is a flowchart illustrating a position segment calculation procedure.
Figure 10:
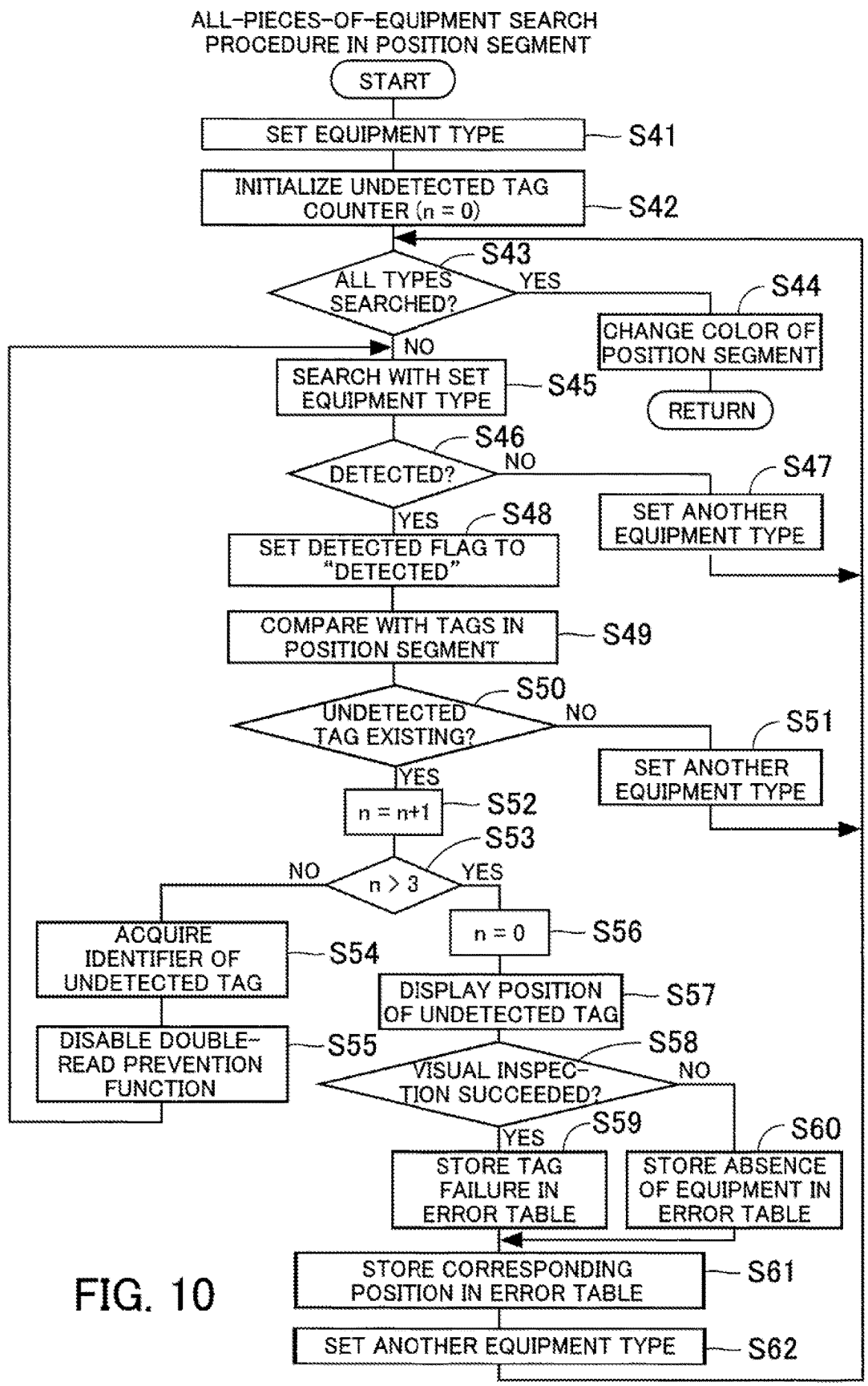
FIG. 10 is a flowchart illustrating an all-items-of-equipment search procedure in a position segment.
Figure 12:
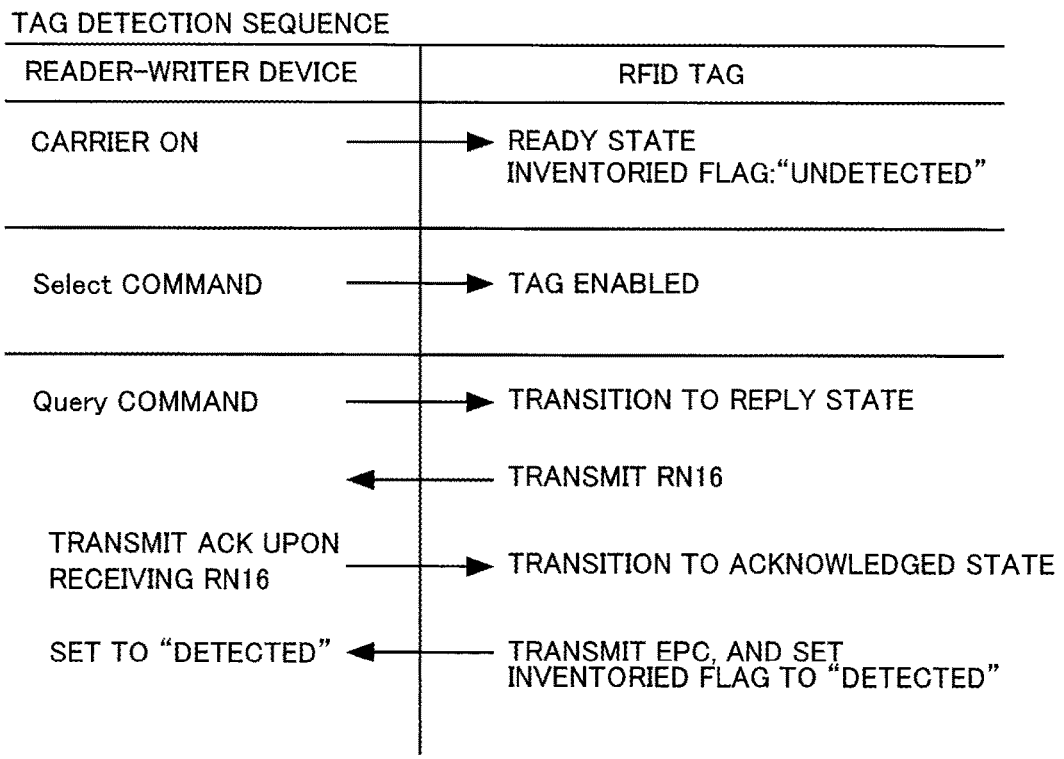
FIG. 12 is an explanatory diagram explaining a general tag detection sequence performed by a reader-writer device.

FIG. 7 is a flowchart illustrating a startup procedure. FIG. 8 is a flowchart illustrating a tag search procedure. FIG. 9 is a flowchart illustrating a position segment calculation procedure. FIG. 10 is a flowchart illustrating an all-items-of-equipment search procedure in a position segment, and FIG. 11 illustrates an exemplary error table.

When a tag detection program is activated in the RFID tag search device 30, the CPU 31 downloads, as illustrated in FIG. 7, the RFID search table 23a and the cabin map information 23b from the server 20 using the communication device 34 (step S11). The RFID search table 23a and the cabin map information 23b downloaded from the server 20 are stored in the memory 32, and the cabin map information 23b is displayed on the display device 35.

Next, the CPU 31 activates the reader-writer device 33 and searches for the RFID tags 40a to 40n (step S12).

In the search process for the RFID tags 40a to 40n, the CPU 31 first calculates, as illustrated in FIG. 8, a position segment indicating where the operator carrying the RFID tag search device 30 is located in the airplane (step S21).

Next, the CPU 31 searches for all the items of equipment provided in the calculated position segment (step S22).

Next, the CPU 31 determines whether or not the search in all the position segments in the airplane has been completed (step S23). When the search in all the position segments in the airplane has not yet completed, the CPU 31 returns to step S21, or the tag search procedure is terminated when the search in all the position segments in the airplane has been completed.

Here, details of the process of calculating the position segment at step S21 will be described. In the position segment calculation procedure, the CPU 31 first sets the type of equipment to be searched, as illustrated in FIG. 9 (step S31). Although any equipment type may be set as long as the equipment type is defined in the RFID search table 23a, a predetermined default value is set here.

Next, the CPU 31 performs a tag search specifying the set equipment type (step S32). Here, when the set equipment type is "life vest", for example a tag search is performed using a Select command with "life vest" being specified as the filter of the parameter.

Next, the CPU 31 determines whether or not an RFID tag attached to an item of equipment of the set type has been detected within a predetermined time (step S33). The determination of whether or not the RFID tag has been detected is based on whether or not an EPC has been received. On this occasion, the CPU 31 sets the detected flag of the detected RFID tag to "detected" in the RFID search table 23a.

When an RFID tag has been detected, the CPU 31 obtains the RFID position where the detected RFID tag is provided referring to the RFID search table 23a based on the received EPC, and calculates the position segment from the RFID position (step S34).

When no RFID tag has been detected at step S33, the CPU 31 detects an RFID tag attached to an item of equipment of another type. In other words, the CPU 31 determines whether or not all the types of equipment have been searched (step S35) and, when there exists an unsearched equipment type, sets another equipment type (step S36), and returns to the process at step S32. Upon determining at step S35 that all the types of equipment have been searched, the CPU 31 determines that the operator does not stay in the set position segment, waits for a predetermined time after having displayed on the display device 35 a message prompting to move to another position (step S37), and returns to the process at step S31.

When which position segment the operator stays in the airplane is calculated according to the aforementioned process, inspection is next performed for all the items of equipment provided in the position segment. The CPU 31 first sets the equipment type, as illustrated in FIG. 10 (step S41). With regard to the setting, a predetermined default value may be set, or any of the types of equipment defined in the RFID search table 23a may be acquired and set.

Next, the CPU 31 initializes an undetected tag counter (step S42). The undetected tag counter counts the number of operation times to set the inventoried flag from "detected" to "undetected" and, when a predetermined number of times is exceeded, terminates the operation, and is set to n=0 in the initialization.

Next, the CPU 31 determines whether or not the search for all the types of equipment has been completed (step S43). Here, when the search for all the types of equipment in the position segment has been completed, the CPU 31 changes the corresponding position segment in the cabin map information 23b being displayed on the display device 35 to a color indicating completion of inspection (step S44), returns to the process of FIG. 8 and proceeds to step S23. The change of color of the position segment is performed by overlaying a figure of a specific color on the corresponding position segment in the cabin map information 23b.

When, at step S43, the search for all the types of equipment has not been completed, the CPU 31 performs a search specifying the set equipment type (step S45), and determines whether or not there exists an RFID tag detected within a predetermined time (step S46). When no RFID tag has been detected within a predetermined time at step S46, the CPU 31 sets another equipment type (step S47), and returns to the process at step S43.

When, at step S46, at least one RFID tag has been detected within a predetermined time, the CPU 31 sets the detected flag of all the newly detected RFID tags to "detected" in the RFID search table 23a (step S48). Next, the CPU 31 compares the newly detected RFID tags with RFID tags existing in the same position segment, referring to the RFID search table 23a (step S49).

Next, the CPU 31 determines whether or not there exists an undetected tag supposed to be existing in the same position segment (step S50) and, when there is no undetected tag, sets another equipment type (step S51) and returns to the process at step S43.

When it is determined at step S50 that there exists an undetected tag, the CPU 31 increments the value of the undetected tag counter (step S52), and determines whether or not the value is equal to or larger than "3" (step S53). When the value of the tag counter is smaller than "3", the CPU 31 acquires the identifier of an undetected tag from the RFID search table 23a (step S54), and attempts to disable the double-read prevention function of the undetected tag by a search using the identifier (step S55). Here, when the cause of the tag being undetected is a communication error during transmission of the EPC, the inventoried flag is supposed to be changed to "unset". The CPU 31 then returns to the process at step S45 where a search based on the equipment type is performed in the next inventory round.

When, at step S53, the value of the tag counter is "3", the value of the tag counter is reset to zero (step S56), the position of the undetected tag is displayed on the display device 35 based on the data of the RFID position of the corresponding undetected tag in the RFID search table 23a, and the operator is prompted to perform visual inspection and also to input the result of the visual inspection using the input device 36 (step S57). On this occasion, it is preferred to display the seat number and the place where the item of equipment is provided (e.g., under the seat for adult life vest) calculated from the X- and Y-coordinates, rather than displaying the position of the undetected tag on the display device 35 in terms of X- and Y-coordinates.

Next, the CPU 31 determines whether or not the visual inspection has been successful based on the input of the result of visual inspection performed by the operator (step S58). Here, when the visual inspection has been successful, the CPU 31 stores the tag failure in an error table (step S59), or stores absence of the item of equipment in the error table when the visual inspection has not been successful (step S60). The error table has columns for the type of equipment corresponding to the undetected tag, the error position, the cause of error, or the like, as illustrated in FIG. 11.

When processes at steps S59 and S60 are completed, the CPU 31 stores the corresponding position of the undetected tag in the error table (step S61), sets another equipment type (step S62), and returns to the process at step S43.

Although the number of times attempting to disable the double-read prevention function of an undetected tag when there exists an undetected tag has been set to two at most in the aforementioned flowchart, the present disclosure is not limited thereto. In addition, although an undetected tag counter is used for counting the number of times attempting to disable the double-read prevention function, there may be provided a button allowing manual switching between disabling and cancelling the disabling of the double-read prevention function, when an undetected tag is found.

The tag detection program, the equipment inspection apparatus, and the equipment inspection method configured as described above are advantageous in that they allow for disabling of the double-read prevention function of an undetected RFID tag supposed to be detected, and therefore the undetected RFID tag is enabled to respond in the event of having become unresponsive during communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a procedure for detecting a double-read preventable RFID (Radio Frequency Identification) tag which does not respond to next and subsequent searches after having answered and responded to a search performed by a reader-writer device, the procedure comprising:
   searching for the RFID tag;
   making a comparison between the RFID tag which has answered and responded to the searching and tag information in a search table storing the tag information of the RFID tag to be searched for; and
   when there exists an undetected RFID tag supposed to respond based on the comparison between the RFID tag having responded and the tag information, making an attempt to restore a state of answering and responding to a search with a search specifying the undetected RFID tag, and searching for the undetected RFID tag.

2. The non-transitory computer-readable storage medium according to claim 1, wherein, as the attempt to restore a state of answering and responding to a search, the procedure further includes forcibly setting an inventoried flag to "undetected", the inventoried flag having an initial value of "undetected" and being set to "detected" when answering and responding to a search are made.

3. The non-transitory computer-readable storage medium according to claim 1, wherein, as the attempt to restore a state of answering and responding to a search, the procedure further includes using a session of a number different from a number of a session used for a search in a preceding inventory round when performing a search specifying the undetected RFID tag.

4. The non-transitory computer-readable storage medium according to claim 1, wherein the procedure further includes displaying an error on a display screen and storing the error in an error table when there is no response from the undetected RFID tag despite that the search for the undetected RFID tag has been repeated for a predetermined number of times.

5. The non-transitory computer-readable storage medium according to claim 1,
   wherein an entire area in which items of equipment each having the RFID tag attached thereto are provided is divided into a plurality of position segments,
   wherein the search table stores therein information on which one of the position segments the RFID tag belongs to, and
   wherein the making a comparison includes compairing the RFID tag having responded with the tag information for each of the position segments.

6. The non-transitory computer-readable storage medium according to claim 5, wherein, in a case where RFID tags to be searched for are attached to the items of equipment according to a plurality of equipment types, the procedure further includes switching to a search for RFID tags of another equipment type upon completion of a search for RFID tags of a certain equipment type in a certain position segment, and terminating the search for RFID tags in the certain position segment upon completion of searches for RFID tags of all the equipment types.

7. An equipment inspection apparatus which inspects that there is equipped, at a predetermined position, an item of equipment having attached thereto an RFID (Radio Frequency Identification) tag which turns into a double-read prevented state due to a transition of a flag from an undetected state to a detected state with a search, the apparatus comprising:
   a search table acquisition unit configured to download, from a server, a search table storing a correspondence relation between the item of equipment and tag information of the RFID tag attached to the item of equipment;
   a search table storage unit configured to store the search table acquired by the search table acquisition unit;
   a tag search unit configured to search for the RFID tag;
   a comparison processing unit configured to make a comparison between the RFID tag having responded after the flag transitioned to a detected state with a search and the tag information in the search table so as to inspect existence of the item of equipment; and
   a re-search processing unit configured to instruct, when there exists an undetected RFID tag supposed to respond based on the comparison performed by the comparison processing unit, the tag search unit to make an attempt to restore the flag to the undetected state with a search specifying the undetected RFID tag, and search for the undetected RFID tag.

8. An equipment inspection method for inspecting that there is equipped, at a predetermined position, an item of equipment having attached thereto an RFID (Radio Frequency Identification) tag which turns into a double-read prevented state due to a transition of a flag from an undetected state to a detected state with a search performed by a tag search device, the method comprising:
   downloading, by the tag search device, from a server, a search table storing a correspondence relation between the item of equipment and tag information of the RFID tag attached to the item of equipment;
   searching, by the tag search device, for the RFID tag attached to the item of equipment;
   making, by the tag search device, a comparison between an RFID tag having responded after the flag transitioned to a detected state with a search and tag information in the search table; and
   when there exists an undetected RFID tag supposed to respond based on the comparison, making an attempt, by the tag search device, to restore the flag to the undetected state with a search specifying the undetected RFID tag, and searching for the undetected RFID tag.

* * * * *